Aug. 9, 1927.

I. STERN 1,638,553

DENTURE ATTACHMENT

Filed Nov. 24, 1924

INVENTOR
*Isidore Stern*
BY
*Bohleber & Ledbetter*
ATTORNEYS

Patented Aug. 9, 1927.

1,638,553

UNITED STATES PATENT OFFICE.

ISIDORE STERN, OF NEW YORK, N. Y.

DENTURE ATTACHMENT.

Application filed November 24, 1924. Serial No. 751,742.

This invention relates to dental bridgework, and more particularly to improvements in adjustable denture attachments or adjustable anchor heads for use in connection with removable bridgework.

An object of the invention is to produce an improved denture attachment or denture anchor head which may be adjusted from time to time to produce a firm and snug fitting relation between a bridge and pier tooth which ordinarily supports said bridge; and particularly an object is to produce an improved adjustable denture head together with a receiving socket therefor of such improved construction that said anchor head fits into the socket with alternately superimposed oppositely pressing wings. To this end my improved denture attachment possesses instrumentalities arranged in such a manner that front and rear wall pressure is set up in the socket by virtue of a plurality of superimposed oppositely diverging wings; this arrangement produces a characteristic spreading contact throughout the full length of the socket for rather than cause the adjustable element to bear against one side of the socket as common with most adjustable dentures, I provide a plurality of bearing wings, a number of which yieldingly press one socket wall and a number of which yieldingly press the opposite wall of the socket.

The accompanying drawing illustrates an embodiment of the invention serving to illustrate the principle thereof, and it is understood how changes may be made without departing from the scope of the invention.

Figure 1:
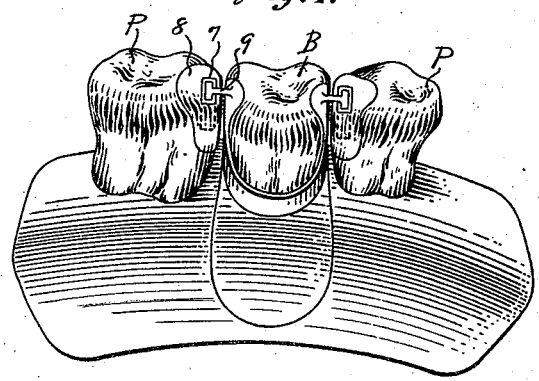
Figure 1 shows an assembled view of the bridge and pier teeth.
Figure 2:
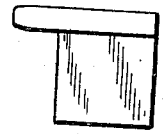
Figure 2 illustrates a side view of the improved denture before the head thereof is split in a plurality of places to provide several wings.
Figure 3:
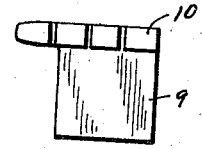
Figure 3 illustrates the head after being split to form several wings.
Figure 4:
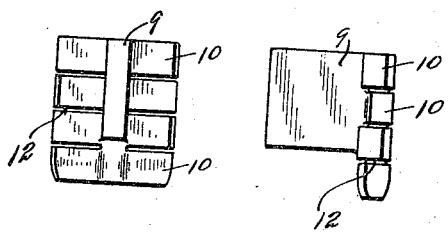
Figure 4 illustrates a cluster view of the attachment showing a top, rear and side elevation thereof.
Figure 5:
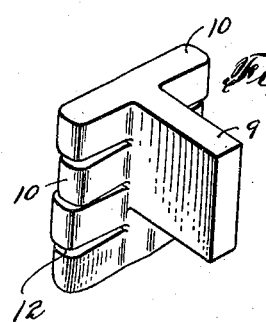
Figure 5 shows the denture attachment in perspective view with the superimposed plurality of wings adjusted to press against the socket in alternate opposite directions.

Referring to the assembly view in the drawing, there is shown pier teeth P with the edentate space therebetween filled in by the artificial and removable bridge B. A socket 7 is usually built into an inlay 8, and it is the usual practice to join the shank 9 to the bridge B and thus cause the head part of the denture to fit down into the socket 7.

Referring further to the drawings for a detailed description of the invention, there is shown a shank 9 to which is integrally made a plurality of cross separable wing elements 10, the combination shank and wing elements producing in effect a T-shaped denture head. The independent wings 10 are formed by the dividing cleft planes or slots 12 which form the plurality of separable wing elements 10 as aforesaid, and the several wings on each side spread out from the shank one above the other.

The wings 10 may be set to any position desired. For example the respective tips of the wings 10 on one level may be set at a slight angle to the shank, while the wings 10 on an adjacent level may be adjustably set at a similarly slight angle to the shank 9 but the angle made by these last mentioned wings is preferably disposed oppositely to the angle of the first wing. In this way the series of superimposed wings act in opposition to each other and press in alternate superimposed planes one above the other against first one side of the wall of the socket 7 and then the other.

While the invention may be adapted to various forms of denture anchor heads, the T-shaped head lends itself admirably to this principle of construction and so I have described how the plurality of superimposed wings spread out to either side of the shank 9 which is used to anchor the denture head to a bridge.

Increased strength and durability in use are inherently gained in this improved denture head for it is observed that the line of joinder between the shank 9 and wings 10 is preferably not interrupted by the cleavage planes 12 since the slots or cleavage lines run from the outer margins to the planes including the surfaces of the shank and stop there. While the head may be cut all the way through from edge to edge, I have shown it as cut only to the shank which leaves the maximum volume of stock at the meeting planes of the head and shank with resulting strength in this improved denture not possible in other adjustable dentures.

The cleavage planes or lines of cuts are extended along planes disposed horizontally assuming the shank is vertical. In other words the plane of the shank 9 and the cleavage planes 12 are substantially right angular, the effect of which is to project the body of the shank forwardly through the wings thereby positioning the wings to either side of the shank. In this way each wing is individually joined at its inner edge to the shank and as many wings as desired may be formed to either side of the shank. Though it is preferable to make an equal number of wings on each side of the shank, it is apparent that this is not strictly necessary.

It is apparent that this invention incorporates features of exceptional merit in that wide range of adjustability is combined with great strength, and neither feature is sacrificed for the other.

What I claim is:—

1. A denture attachment for removable bridge work comprising a support, T-shaped in horizontal cross section, whereof the head is adapted to be received in a pier tooth socket and the shank is adapted to be secured to a dental bridge, said head being formed with a plurality of horizontal slots extending, respectively, from the edges of the head inwardly to the vertical planes including the sides of the shank and defining a plurality of superimposed wings upon opposite sides of the shank adapted to be alternately offset in opposite directions from the vertical median plane of the head to alternately yieldingly engage each of the opposed walls of the pier tooth socket at a plurality of points.

2. A denture attachment for removable bridge work comprising a support, T-shaped in horizontal cross section, whereof the head is adapted to be received in a pier tooth socket and the shank is adapted to be secured to a dental bridge, said head being formed with a plurality of horizontal slots extending, respectively, from the edges of the head inwardly to the vertical planes including the sides of the shank, and defining a plurality of superimposed wings upon opposite sides of the shank, respectively adapted to be alternately displaced at an angle to the vertical median plane of the head in opposite directions to engage opposed walls of the pier tooth socket at a plurality of points.

In testimony whereof I affix my signature.

ISIDORE STERN.